(12) United States Patent
Moulin

(10) Patent No.: US 10,787,102 B2
(45) Date of Patent: Sep. 29, 2020

(54) RECLINER MECHANISM

(71) Applicant: Lear Corporation, Southfield, MI (US)

(72) Inventor: Antoine Moulin, Aurec-sur-Loire (FR)

(73) Assignee: LEAR CORPORATION, Southfield, MI (US)

( * ) Notice: Subject to any disclaimer, the term of this patent is extended or adjusted under 35 U.S.C. 154(b) by 45 days.

(21) Appl. No.: 16/126,339

(22) Filed: Sep. 10, 2018

(65) Prior Publication Data

US 2020/0079247 A1 Mar. 12, 2020

(51) Int. Cl.
*B60N 2/23* (2006.01)
*B60N 2/235* (2006.01)
*A47C 1/026* (2006.01)

(52) U.S. Cl.
CPC ............ *B60N 2/2358* (2013.01); *A47C 1/026* (2013.01); *B60N 2/236* (2015.04)

(58) Field of Classification Search
CPC ........ B60N 2/2358; B60N 2/236; B60N 2/20; B60N 2/2227; B60N 2/2362; A47C 1/026
USPC ....................... 297/373, 367 P, 367 L, 367 R
See application file for complete search history.

(56) References Cited

U.S. PATENT DOCUMENTS

| | | | |
|---|---|---|---|
| 6,007,153 A * | 12/1999 | Benoit | B60N 2/2358 297/363 |
| 7,165,813 B2 | 1/2007 | Tame | |
| 7,168,764 B2 | 1/2007 | Reubeuze et al. | |
| 7,360,838 B2 | 4/2008 | Smuk | |
| 7,497,519 B2 * | 3/2009 | Dill | B60N 2/2252 297/362 |
| 7,648,205 B2 * | 1/2010 | Zou | B60N 2/20 297/367 R |
| 8,459,743 B2 * | 6/2013 | Villarroel | B60N 2/236 297/367 P |
| 8,585,149 B2 * | 11/2013 | Villarroel | B60N 2/236 297/367 L |
| 8,616,648 B2 * | 12/2013 | Holzhueter | B60N 2/236 297/367 P |
| 8,616,649 B2 * | 12/2013 | Uramichi | B60N 2/682 297/367 P |
| 8,668,269 B2 * | 3/2014 | Jaudouin | B60N 2/2362 297/366 |
| 8,985,690 B2 * | 3/2015 | Yamada | B60N 2/2358 297/341 |
| 9,167,898 B2 | 10/2015 | Wahls et al. | |
| 9,873,357 B1 | 1/2018 | McCulloch et al. | |
| 2003/0025376 A1 * | 2/2003 | Moriyama | B60N 2/236 297/367 R |
| 2009/0218870 A1 * | 9/2009 | Kawamura | B60N 2/20 297/367 R |
| 2010/0127546 A1 * | 5/2010 | Dziedzic | B60N 2/236 297/367 R |
| 2011/0115271 A1 * | 5/2011 | Yamada | B60N 2/236 297/367 P |
| 2012/0169105 A1 * | 7/2012 | Assmann | B60N 2/236 297/367 P |

(Continued)

*Primary Examiner* — Mark R Wendell
(74) *Attorney, Agent, or Firm* — Brooks Kushman PC

(57) ABSTRACT

A recliner mechanism having a first plate, a second plate, and at least one pawl. The first plate has a first set of teeth. The second plate has a second set of teeth. The pawl that has a set of pawl teeth that engage the first set of teeth and the second set of teeth to inhibit rotation of the second plate with respect to the first plate.

20 Claims, 10 Drawing Sheets

(56) References Cited

U.S. PATENT DOCUMENTS

| | | | |
|---|---|---|---|
| 2012/0279337 A1* | 11/2012 | Endo | B60N 2/2356 74/411.5 |
| 2013/0187426 A1* | 7/2013 | Nagura | B60N 2/236 297/367 P |
| 2014/0225409 A1* | 8/2014 | Nagura | B60N 2/236 297/354.1 |
| 2015/0165936 A1* | 6/2015 | Wei | B60N 2/236 297/367 P |
| 2015/0321585 A1 | 11/2015 | McCulloch et al. | |
| 2017/0020289 A1 | 1/2017 | Veine et al. | |
| 2017/0203671 A1* | 7/2017 | Runde | B60N 2/2356 |
| 2019/0299821 A1* | 10/2019 | Maeda | B60N 2/236 |

* cited by examiner

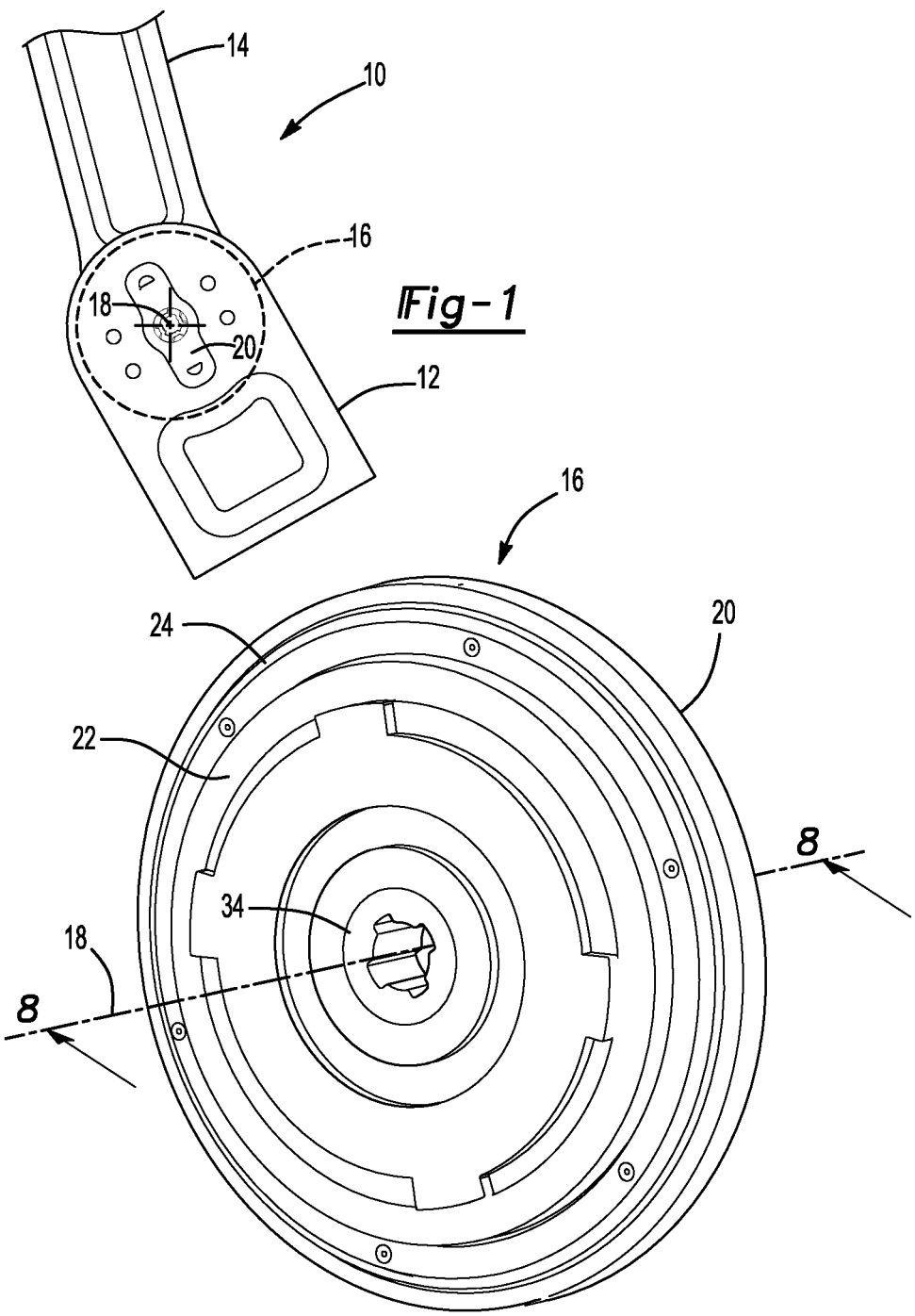

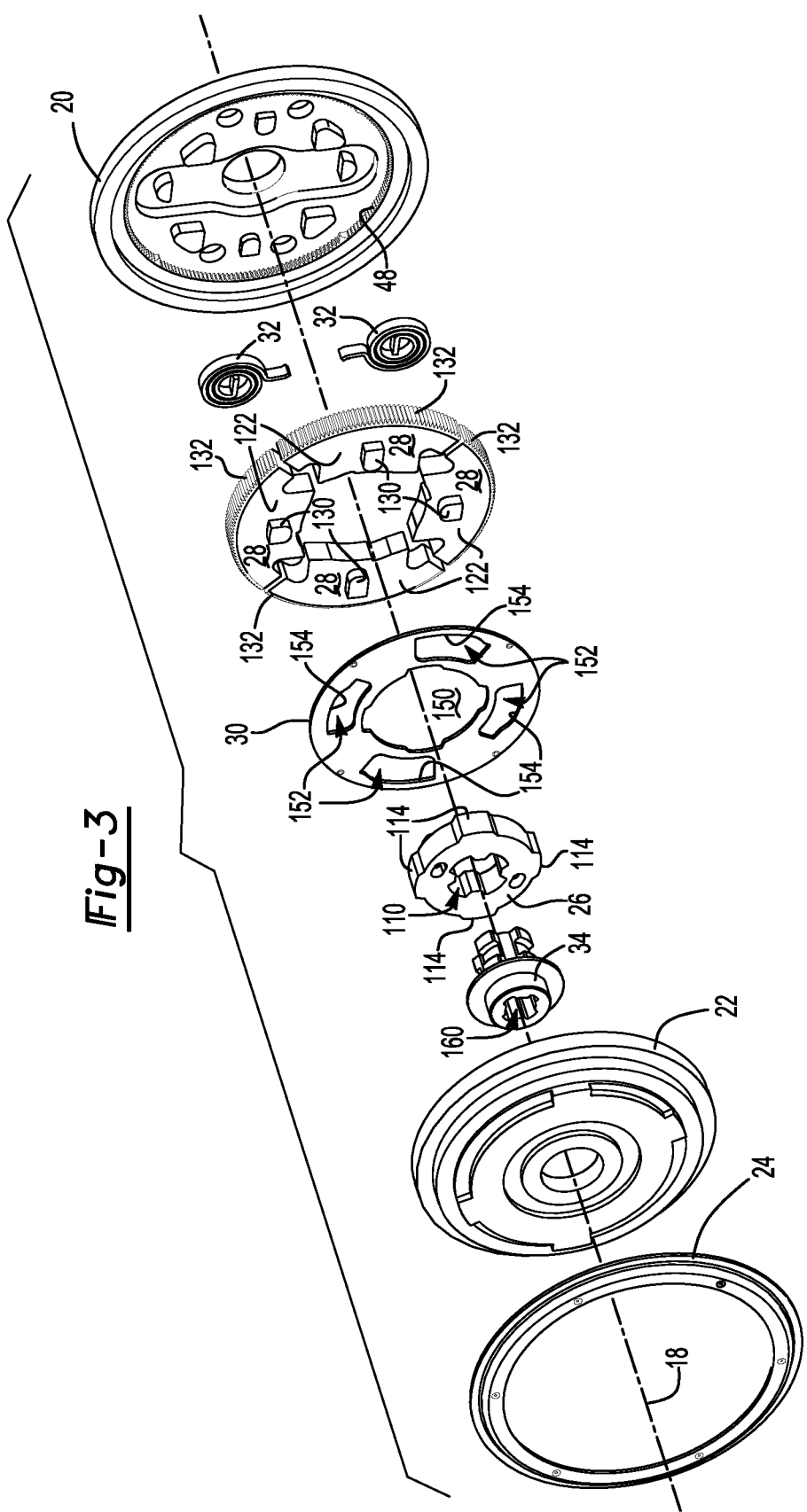

US 10,787,102 B2

RECLINER MECHANISM

TECHNICAL FIELD

The present application relates to a recliner mechanism that may be provided with a seat assembly, such as a seat assembly for a motor vehicle.

BACKGROUND

A recliner mechanism for a seat is disclosed in U.S. Patent Publication No. 2015/0321585.

SUMMARY

In at least one embodiment, a recliner mechanism is provided. The recliner mechanism may include a first plate, a second plate, and at least one pawl. The first plate may have a first set of teeth. The second plate may be rotatable about an axis with respect to the first plate and may have a second set of teeth. The pawl may have a first lateral side, a second lateral side, and set of pawl teeth arranged between the first lateral side and the second lateral side. The set of pawl teeth may include a first pawl tooth and a second pawl tooth. The first pawl tooth may be disposed closer to the first lateral side than the second pawl tooth. The first pawl tooth may engage the first set of teeth but not the second set of teeth and the second pawl tooth may engage the second set of teeth but not the first set of teeth to inhibit rotation of the second plate with respect to the first plate.

In at least one embodiment, a recliner mechanism is provided. The recliner mechanism may include a first plate, a second plate, and at least one pawl. The first plate may have a first set of teeth. The second plate may be rotatable about an axis with respect to the first plate and may have a second set of teeth. The pawl may have a first lateral side, a second lateral side, and set of pawl teeth. The pawl teeth may extend away from the axis and toward the first set of teeth and the second set of teeth. The pawl teeth may be arranged between the first lateral side to the second lateral side such that the pawl teeth are positioned progressively further from the axis in a direction that extends from the first lateral side to the second lateral side.

In at least one embodiment, a recliner mechanism is provided. The recliner mechanism may include a first plate, a second plate, and at least one pawl. The first plate may have a first set of teeth that may be arranged around an axis. The first set of teeth may include a first tooth segment having teeth that may be arranged at different radial distances from the axis. The second plate may be rotatable about the axis with respect to the first plate and may have a second set of teeth. The pawl may have a set of pawl teeth that may engage the first set of teeth and the second set of teeth to inhibit rotation of the second plate with respect to the first plate.

BRIEF DESCRIPTION OF THE DRAWINGS

FIG. 1 is a perspective view of a portion of a seat assembly having a recliner mechanism.

FIG. 2 is a perspective view of the recliner mechanism.

FIGS. 3 and 4 are exploded views of the recliner mechanism.

DETAILED DESCRIPTION

Figure 4:
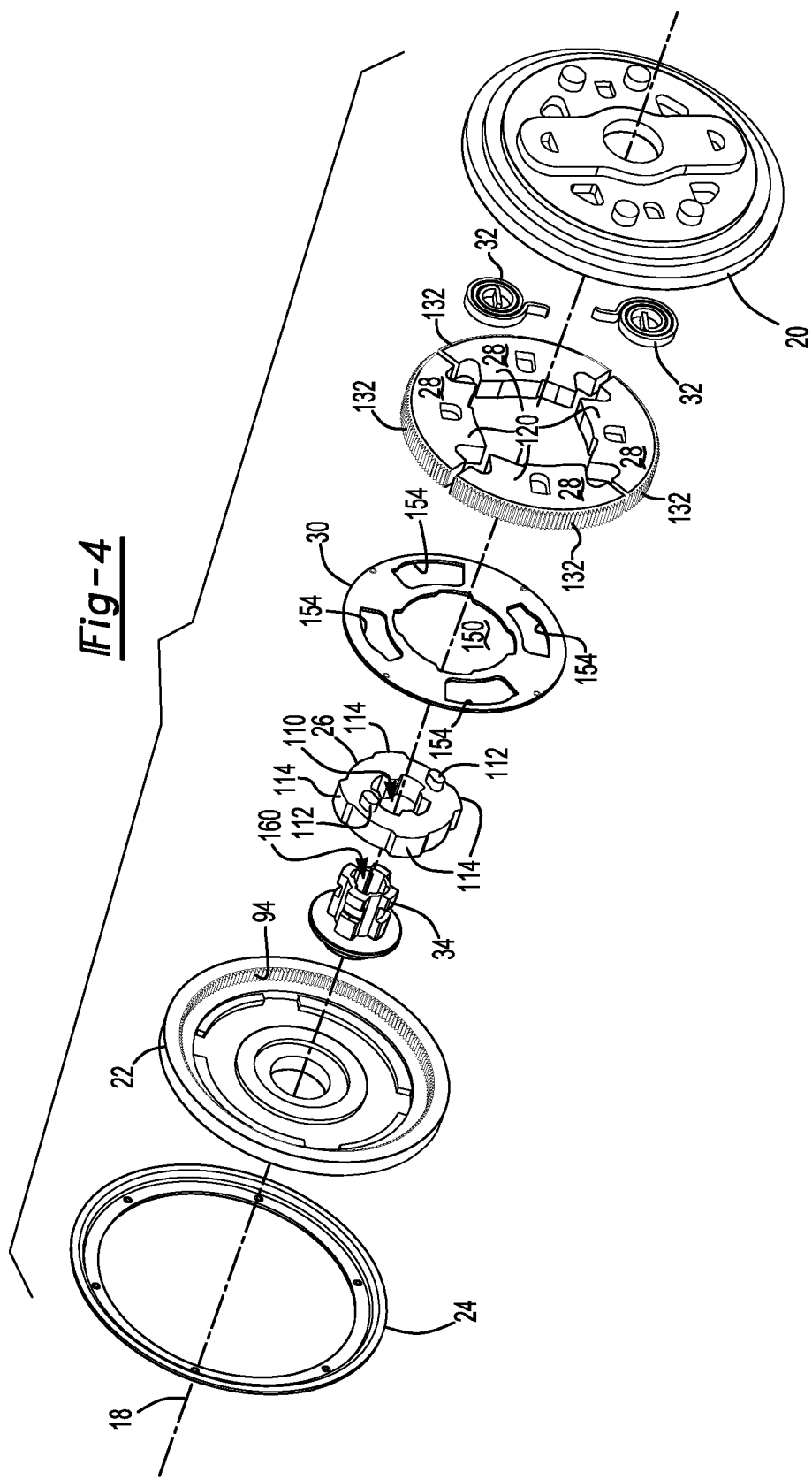

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of a seat assembly 10 is shown. The seat assembly 10 may have a seat bottom 12, a seat back 14, and a recliner mechanism 16.

The recliner mechanism 16 may be configured to control pivoting of the seat back 14 about an axis 18 and with respect to the seat bottom 12. For example, the recliner mechanism 16 may facilitate pivoting of the seat back 14 between a folded position in which the seat back 14 may be generally positioned over the seat bottom 12 and a reclined position in which the seat back 14 is pivoted away from the seat bottom 12 such that the seat back 14 may be positioned at an obtuse angle with respect to the seat bottom 12. The recliner mechanism 16 may hold the seat back 14 in various angular positions between the folded position and the reclined position. As such, the recliner mechanism 16 may selectively permit pivoting or inhibit pivoting of the seat back 14 about the axis 18.

The recliner mechanism 16 may be disposed along a lateral side of the frame of the seat bottom 12 and a lateral side of a frame of the seat back 14. For example, the recliner mechanism 16 may be positioned along the axis 18 between the frame of the seat bottom 12 and the frame of the seat back 14. In FIG. 1, the recliner mechanism 16 is positioned axially inboard from the frame of the seat bottom 12 and axially outboard from the frame of the seat back 14.

Referring to FIG. 2, a perspective view of the recliner mechanism 16 is shown. The recliner mechanism 16 may generally have a disc shape.

Referring to FIGS. 3 and 4, exploded views of the recliner mechanism 16 are shown. More specifically, FIGS. 3 and 4 show components of the recliner mechanism 16 from different perspectives to better depict features that may not be visible from a single perspective or when the recliner mechanism 16 is assembled. In at least one configuration, the recliner mechanism 16 may include a first plate 20, a second plate 22, a retainer ring 24, a cam 26, at least one pawl 28, a cam disc 30, at least one biasing member 32, and a hub 34.

Figure 5:
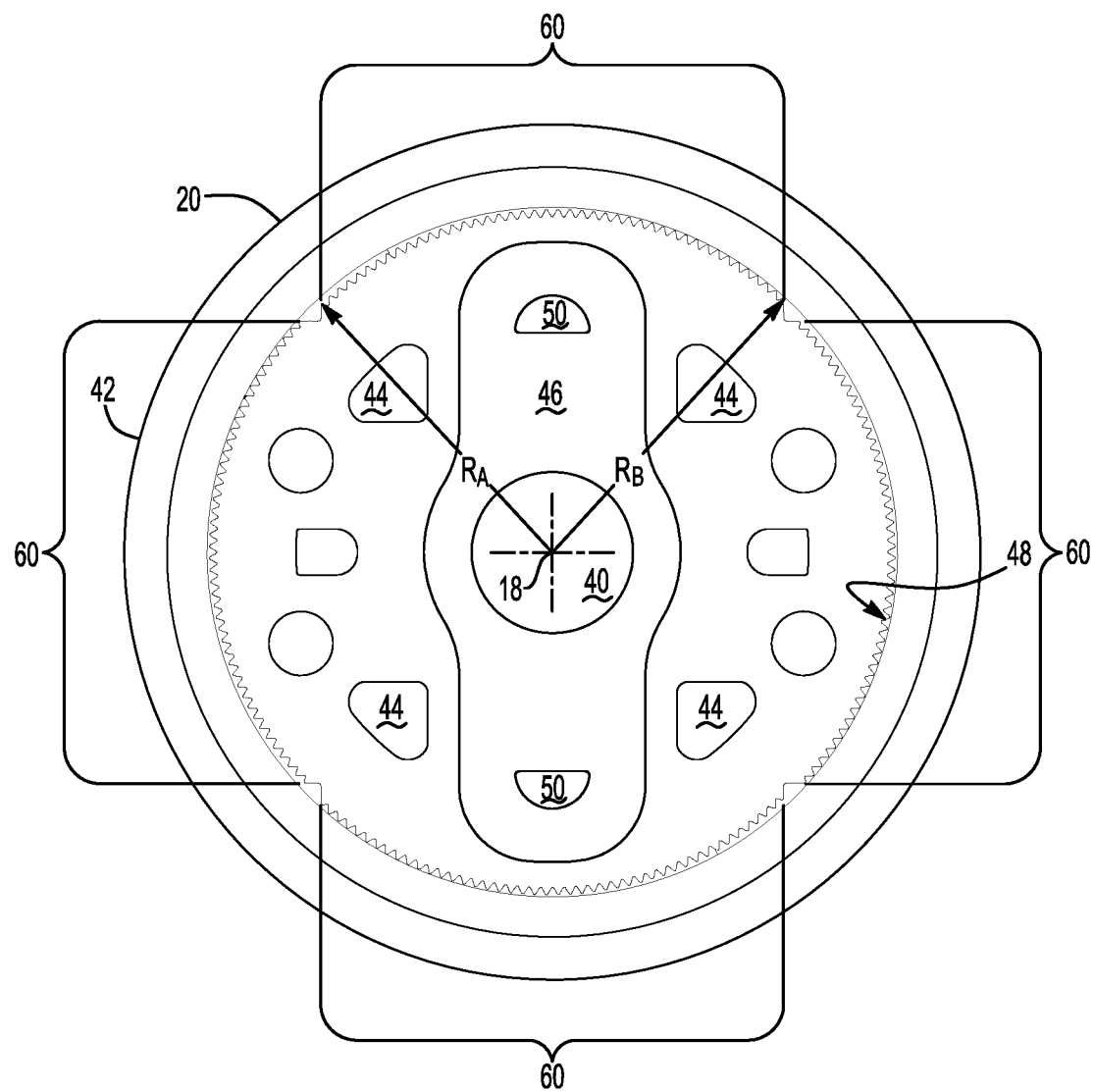
FIG. 5 is a side view of a first plate of the recliner mechanism.

Referring to FIGS. 3-5, the first plate 20 may be configured to be fixedly positioned on the seat bottom 12 or with respect to a seat bottom 12. In at least one configuration, the first plate 20 may be generally configured as a circular disc and may include a center hole 40, an outer surface 42, a plurality of guide blocks 44, one or more slots 46, and a first set of teeth 48.

The center hole 40 may be disposed proximate the center of the first plate 20. The center hole 40 may be configured as a through hole and may be radially disposed about the axis 18.

The outer surface 42 may be disposed opposite the center hole 40 and may face toward and may engage the retainer ring 24. In at least one configuration, the outer surface 42 or a portion thereof may be radially disposed with respect to the axis 18 and may at least partially define an outside circumference of the first plate 20.

The guide blocks 44 may be configured to guide movement of a pawl 28. In the configuration shown, four guide blocks are provided; however, it is contemplated that a greater or lesser number of guide blocks may be provided, such as to accommodate a different number of pawls 28. The guide blocks 44 may be configured as protrusions that may extend from an interior side of the first plate 20 toward the second plate 22. A pair of guide blocks 44 may cooperate to at least partially define an opening that may receive a pawl 28. As such, a pawl 28 may be received between a pair of guide blocks 44 and the guide blocks 44 may guide movement of the pawl 28 in a radial direction, or in a direction that extends toward or away from the axis 18. The guide blocks 44 may also act as a stop that may limit movement of a pawl 28 toward the axis 18.

One or more slots 46 may be disposed between the center hole 40 and the outer surface 42. For example, a slot 46 may be radially positioned between the center hole 40 and the first set of teeth 48. A slot 46 may be configured as a recess that may be disposed in the interior side of the first plate 20 that may face toward the second plate 22. A slot 46 may receive and position at least one biasing member 32 that may exert a biasing force on the cam 26 and may actuate one or more pawls 28 in a radially outward direction or away from the axis 18 via the cam 26 as will be discussed in more detail below.

One or more mounting features 50 may be associated with a slot 46. A mounting feature 50 may facilitate coupling of a biasing member 32 to the first plate 20. The mounting feature 50 may have any suitable configuration. In FIG. 5, the mounting feature 50 is configured as a protrusion that is disposed in the slot 46 and that extends toward the second plate 22; however, it is also contemplated that the mounting feature 50 may be provided in other configurations, such as a recess that may receive a portion of a biasing member 32.

The first set of teeth 48 may be selectively engaged by the pawls 28. The first set of teeth 48 may extend in an axial direction away from the second plate 22. For example, the first set of teeth 48 may extend from a side or face of the first plate 20 that may face toward or may engage or contact the second plate 22.

The first set of teeth 48 may have any suitable profile. In the configuration shown in FIG. 5, the first set of teeth 48 are provided with a substantially triangular or sawtooth configuration. The profile of the first set of teeth 48 may extend axially or substantially parallel to the axis 18.

The first set of teeth 48 may be arranged around the axis 18 such that the first set of teeth 48 may be disposed opposite the outer surface 42 and the teeth 48 and may face toward and extend toward the axis 18.

As is best shown in FIG. 5, members of the first set of teeth 48 may be arranged in discrete subgroups or tooth segments. In the configuration shown in FIG. 5, the first set of teeth 48 are divided into four tooth segments or subgroups, which are each designated with reference number 60; however, it is contemplated that a greater or lesser number of tooth segments may be provided. A toothed segment 60 may be disposed immediately adjacent to at least one other toothed segment 60 or may be separated from an adjacent toothed segment 60 by a gap that may lack teeth or by a protrusion. A toothed segment 60 may include multiple members of the first set of teeth 48. The teeth 48 in a toothed segment 60 may be contiguous with each other in one or more configurations. In at least one configuration, a toothed segment 60 may extend from or may be located between a first step 70 and a second step 72, which are best shown in FIG. 11.

Some of the teeth 48 or all of the teeth 48 in a toothed segment 60 may be arranged at different radial distances from the axis 18. In a basic configuration, the tooth 48 of the toothed segment 60 that is disposed closest to the first step 70 may be disposed closer to the axis 18 than the tooth 48 of the toothed segment 60 that is disposed closest to the second step 72. As such, a tip 80 or point that is disposed closest to the axis 18 of the tooth 48 that is disposed closest to the first step 70 may be disposed closer to the axis 18 or at a shorter radial distance from the axis 18 than the tip 80 of the tooth 48 that is disposed closest to the second step 72. As another example, a root 82 may be disposed between two adjacent teeth 48 or disposed between adjacent members of the first set of teeth 48 and may be located at a point or distance that is disposed furthest from the axis 18 with respect to its associated teeth 48 such that the roots 82 may be disposed progressively further from the axis 18 in a direction that extends from the first step 70 toward the second step 72.

Figure 11:
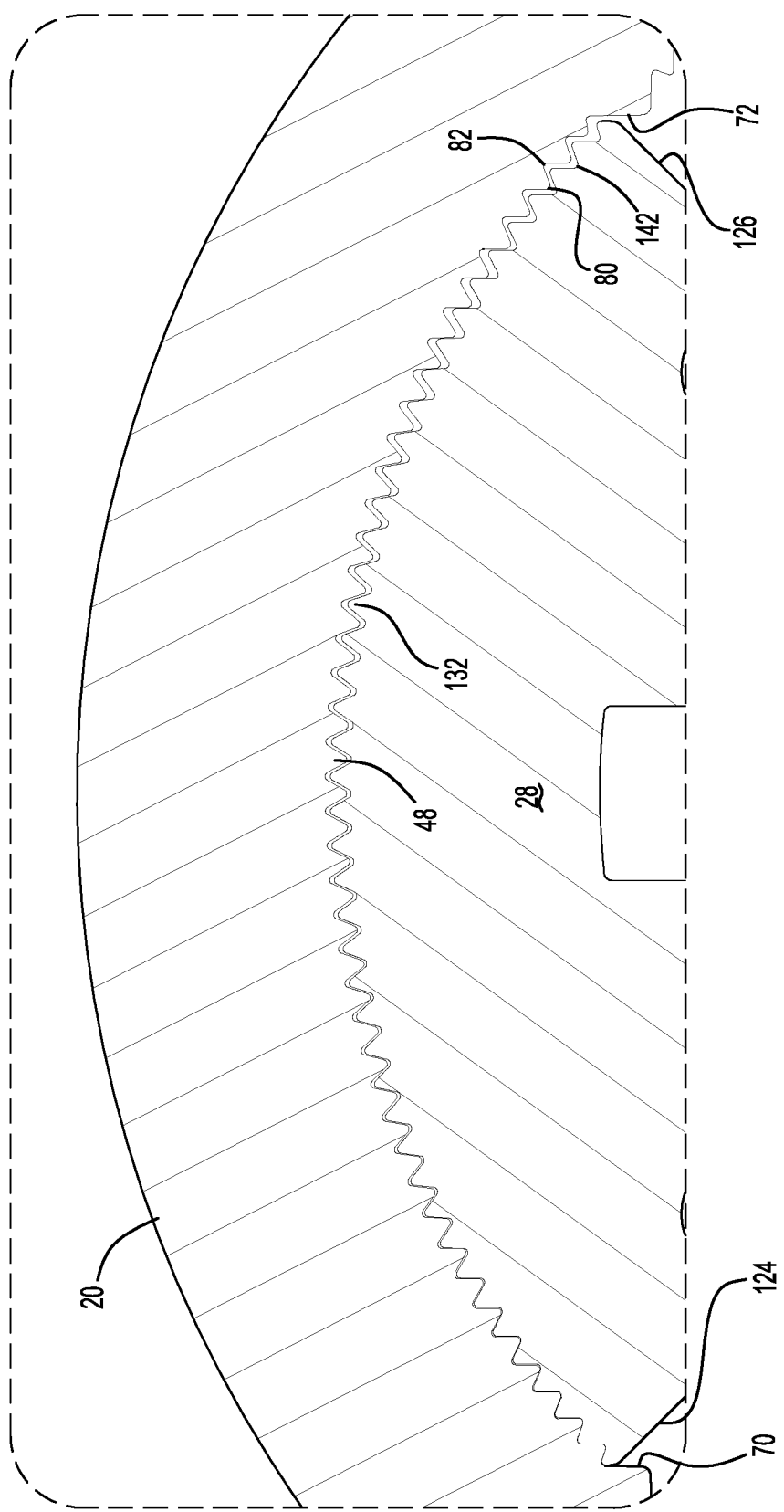
FIG. 11 is a magnified view of a portion of the recliner mechanism along section line 11-11.

As a more nuanced example in which a toothed segment 60 is described with more than two teeth 48, the teeth 48 in a toothed segment 60 may be positioned progressively further from the axis 18 in a direction that extends from the first step 70 to the second step 72, which may be a clockwise direction from the perspective shown in FIG. 11. As such, the tooth 48 that is disposed closest to the first step 70 may be disposed closer to the axis 18 than an adjacent tooth 48 or next tooth in sequence that is disposed closer to the second step 72. The next tooth that is disposed closer to the second step 72 may be disposed further from the axis 18 than the preceding tooth and so on. In such a configuration, each tooth 48 may be arranged along an arc such that each tooth 48 is positioned at a greater radial distance from the axis 18 than a preceding tooth 48. Such positioning is best understood with reference to the schematic representation shown in FIG. 12.

Figure 12:
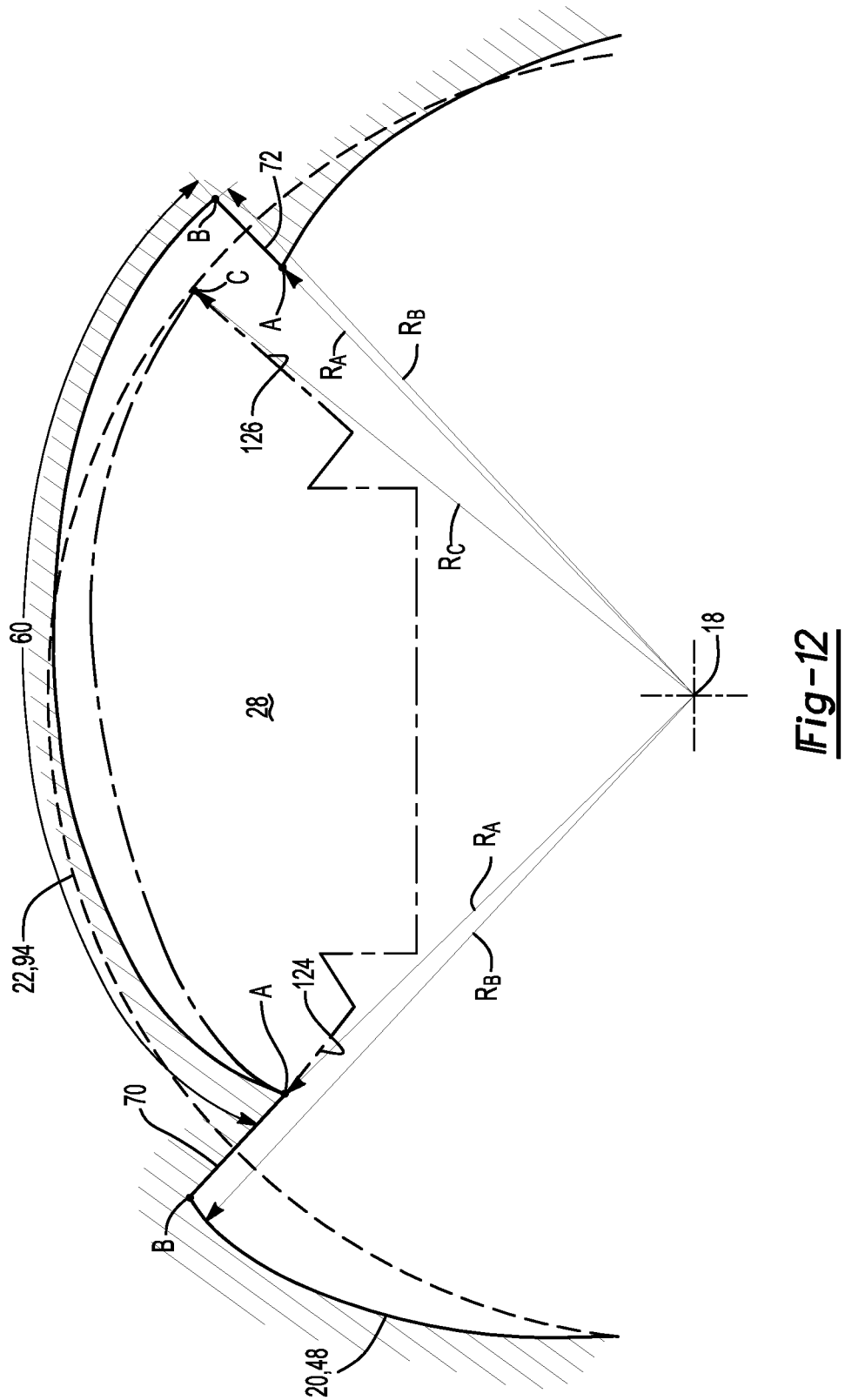
FIG. 12 is a schematic representation of the recliner mechanism.

In FIG. 12, toothed segment 60 is represented with a solid line without showing the profile of the teeth 48 for clarity. At point A, a tooth 48 may be positioned at radial distance $R_A$ from the axis 18. At point B, a tooth 48 may be positioned at a radial distance $R_B$ from the axis 18. Radial distance $R_B$ may be greater than radial distance $R_A$. In an arrangement in which the teeth 48 are positioned progressively further away from the axis 18, the radial distance to the toothed segment 60 may progressively increase from point A to point B. Thus, a tooth 48 that is disposed closer to point B than point A may be disposed further from the axis 18 than a preceding tooth 48 that is disposed closer to point A.

It is also contemplated that some of the teeth 48 of a toothed segment 60 could be arranged at the same radial distance from the axis 18 or that the teeth 48 may be arranged in steps or additional subgroups such that two or more teeth 48 may be arranged at the same radial distance from the axis 18 while at least one preceding tooth may be disposed closer to the axis 18 or at least one subsequent tooth may be disposed further from the axis 18. For example, one or more teeth 48 may be disposed at the same radial distance from the axis 18 but may be disposed further from the axis 18 than one or more preceding teeth 48 disposed closer to point A or may be disposed further from the axis 18 than one or more succeeding teeth disposed closer to point B. In addition, it is contemplated that members of the first set of teeth 48 may be contiguous with each other or that a discontinuous tooth arrangement may be provided, such as with a gap or tooth-free segment disposed between teeth or subgroups of contiguous teeth.

Figure 6:
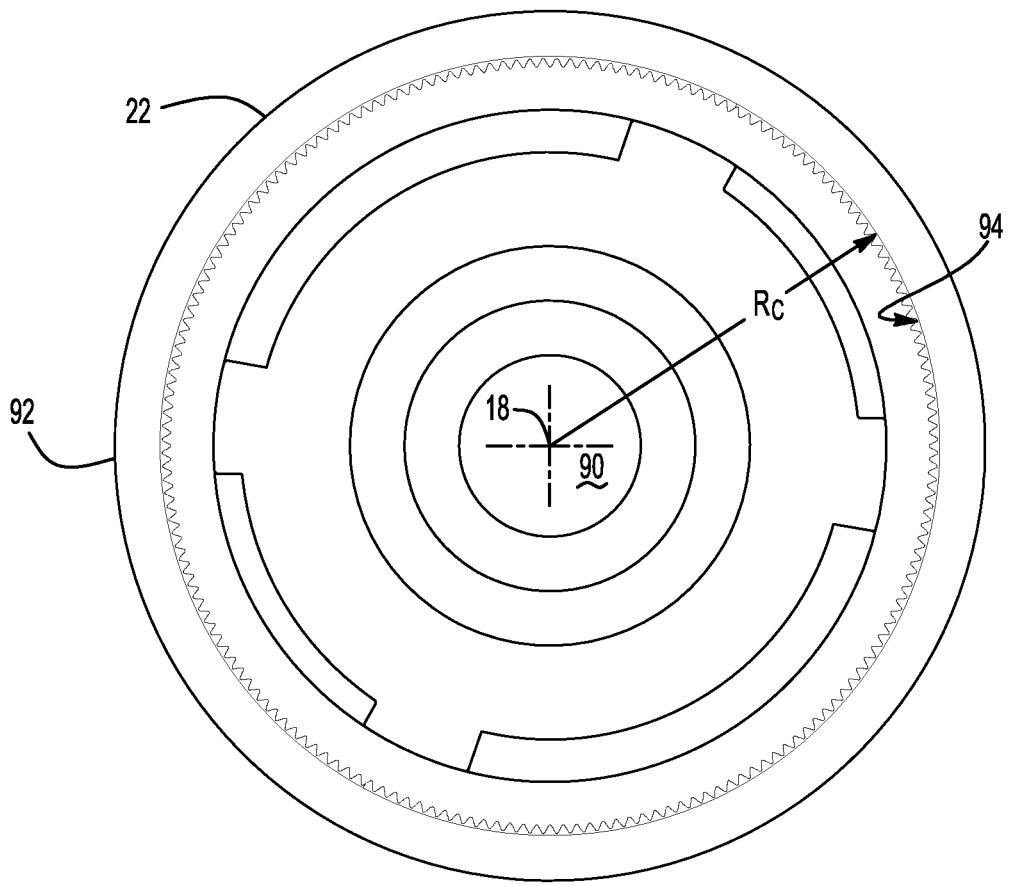
FIG. 6 is a side view of a second plate of the recliner mechanism.

Referring to FIGS. 3, 4, and 6, the second plate 22 may be configured to be coupled to the seat back 14 and may be rotatable about the axis 18 with respect to the first plate 20. For example, the second plate 22 may be coupled to a side member of the seat back frame or may be fixedly disposed on a recliner mounting bracket that may be coupled to the seat back frame. In at least one configuration, the second plate 22 may include a center hole 90, an outer surface 92, and a second set of teeth 94.

The center hole 90 may be disposed proximate the center of the second plate 22. The center hole 90 may be radially disposed about the axis 18.

Figure 8:
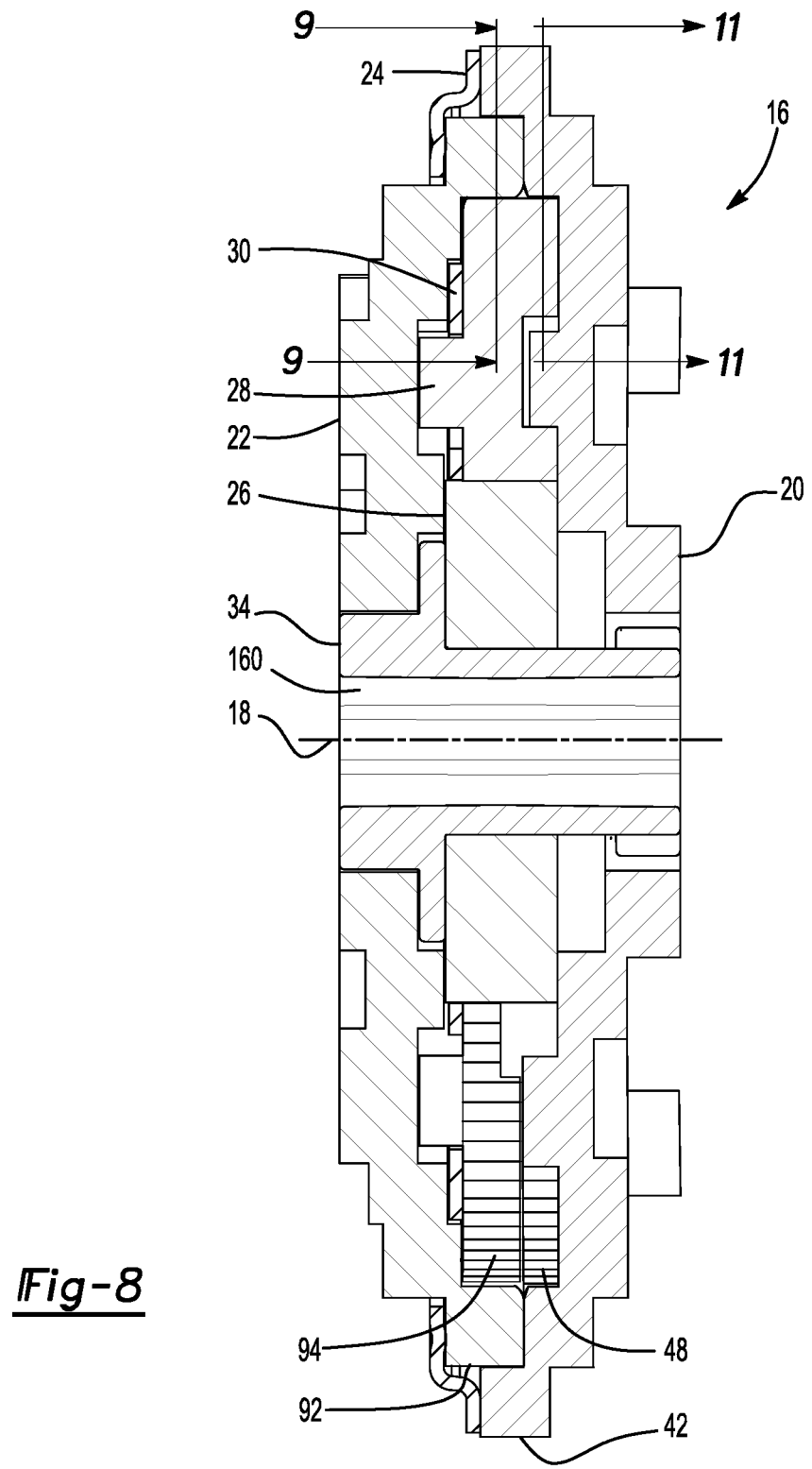
FIG. 8 is a section view of the recliner mechanism along section line 8-8 with a pawl omitted for clarity.

The outer surface 92 may be disposed opposite the center hole 90 and may face toward the retainer ring 24. In at least one embodiment, the outer surface 92 or a portion thereof may be radially disposed with respect to the axis 18 and may at least partially define an outside circumference of the second plate 22. As is best shown in FIG. 8, the outer surface 92 of the second plate 22 may be disposed closer to the axis 18 than the outer surface 42 of the first plate 20.

The second set of teeth 94 may be selectively engaged by the pawls 28. The second set of teeth 94 may extend in an axial direction away from the first plate 20. For example, the second set of teeth 94 may extend from an interior face of the second plate 22 that may face toward or may engage the first plate 20. As such, the second set of teeth 94 may be disposed adjacent to the first set of teeth 48 as is best shown in FIG. 8. As is best shown in FIG. 6, the second set of teeth 94 may be arranged around the axis 18. For example, the second set of teeth 94 may be disposed opposite the outer surface 92 and may face toward and extend toward the axis 18. In at least one configuration, members of the second set of teeth 94 may be arranged in a repeating manner around the axis 18. Moreover, the second set of teeth 94 may be contiguous or may extend continuously around the axis 18; however, it is contemplated that a discontinuous configuration may also be provided.

The second set of teeth 94 may have any suitable profile. For example, the second set of teeth 94 may be provided with the same profile or substantially the same profile as the first set of teeth 48. In the configuration shown in FIG. 6, the second set of teeth 94 are provided with a substantially triangular or sawtooth configuration. The profile of the second set of teeth 94 may extend axially or substantially parallel to the axis 18.

Figure 10:
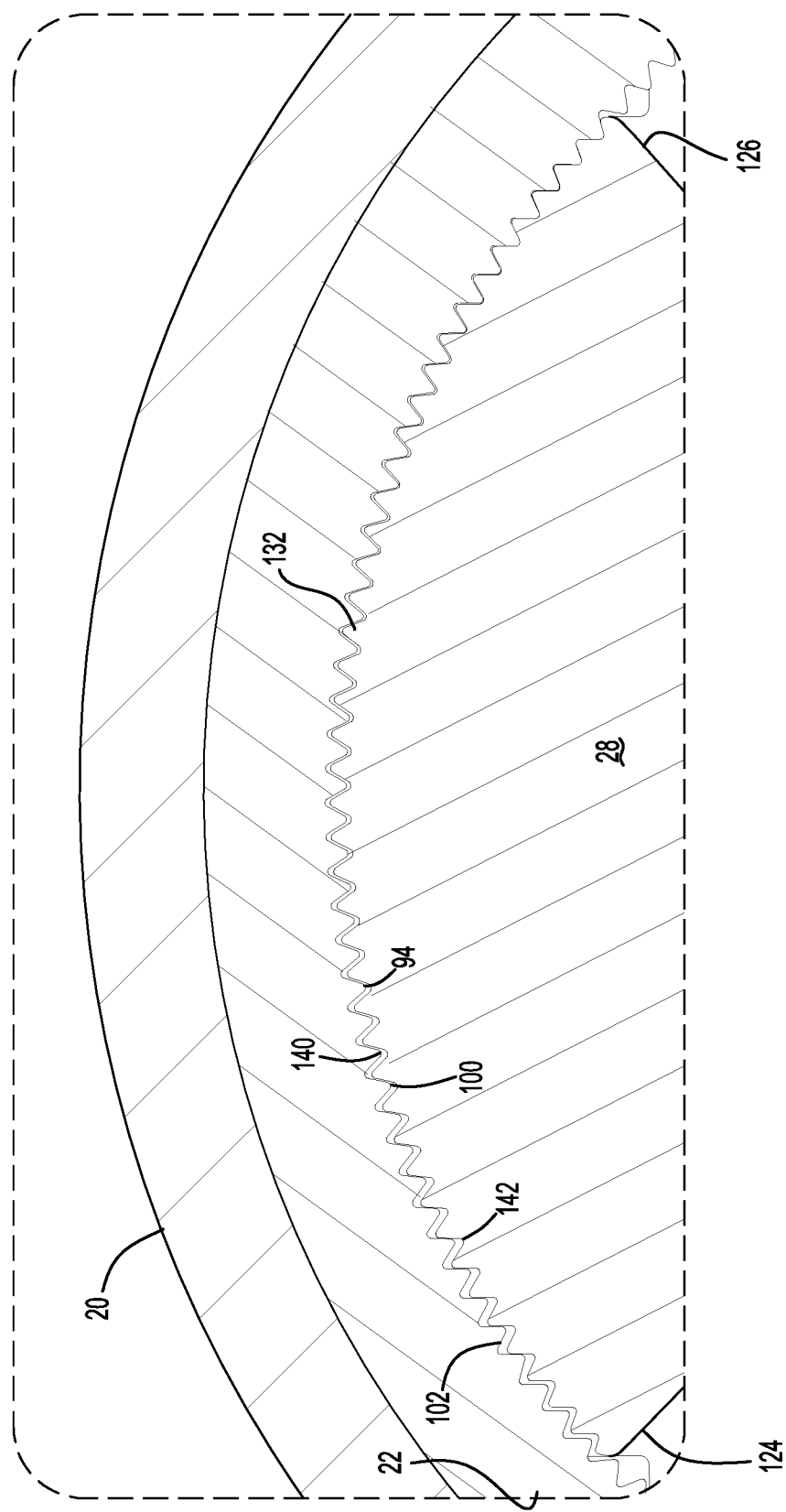
FIG. 10 is a magnified view of a portion of FIG. 9.

Unlike the first set of teeth 48, the second set of teeth 94 may be located at a common radial distance from the axis 18 or a constant or substantially constant radial distance from the axis 18. For example, as is best shown in FIG. 10, each member of the second set of teeth 94 may have a tip 100 or point that is disposed closest to the axis 18, and the tips 100 may be disposed at a constant or substantially constant radial distance from the axis 18. As another example, a root 102 may be disposed between two adjacent teeth 94 (e.g., disposed between adjacent members of the second set of teeth 94) and may be located at a point or distance that is disposed furthest from the axis 18 with respect to its associated teeth 94, and the roots 102 may be disposed at a constant or substantially constant radial distance from the axis 18. Such positioning is best understood with reference to FIG. 6 as well as the schematic representation shown in FIG. 12.

In FIG. 12, the second set of teeth 94 is represented by a dashed line without showing the profile of the teeth for clarity. In FIG. 12, the dashed line is used to distinguish from other line types in FIG. 12 and is not intended to signify that the entire dashed line is hidden. The teeth 94 may be positioned at a radial distance $R_C$ from the axis 18. Radial distance $R_C$ may be greater than radial distance $R_A$ and less than radial distance $R_B$.

Referring to FIGS. 2-4 and 8, the retainer ring 24 may rotatably couple the second plate 22 to the first plate 20. For example, the retainer ring 24 may be fixedly attached to the first plate 20 but may not be fixedly attached to the second plate 22. As such, the second plate 22 may be received between the retainer ring 24 and the first plate 20 such that axial movement of the second plate 22 is inhibited while rotational movement of the second plate 22 with respect to the retainer ring 24 and first plate 20 may be permitted. The retainer ring 24 may be fixedly attached to the first plate 20 in any suitable manner, such as by welding or with one or more fasteners. In at least one configuration, the retainer ring 24 may be configured as a ring that may extend continuously around the second plate 22 and the axis 18.

Referring to FIGS. 3, 4, 8 and 9, the cam 26 may facilitate actuation of the pawls 28. The cam 26 may be axially positioned between the first plate 20 and the second plate 22 as is best shown in FIG. 8 and may be configured to rotate about the axis 18. In at least one configuration, the cam 26 may include a center hole 110, one or more cam pins 112, and a plurality of cam lobes 114.

Referring to FIGS. 3 and 4, the center hole 110 may extend along the axis 18. In at least one configuration, the center hole 110 may have a non-circular shape that may facilitate rotational engagement with the hub 34.

Referring to FIG. 4, one or more cam pins 112 may extend from a side of the cam 26 toward the first plate 20. In addition, each cam pin 112 may be radially positioned between the center hole 110 and a cam lobe 114 or an outer surface of the cam 26 that may be disposed opposite the center hole 110. A cam pin 112 may engage a corresponding biasing member 32.

The cam lobes 114 may be provided around the periphery of the cam 26. In FIG. 4, four cam lobes 114 are shown; however, it is contemplated that a greater or lesser number of cam lobes 114 may be provided. The cam lobes 114 may be disposed opposite the center hole 110, may extend away from the axis 18, and may engage and actuate a corresponding pawl 28, such as when the cam 26 is rotated to extend a pawl 28.

Figure 9:
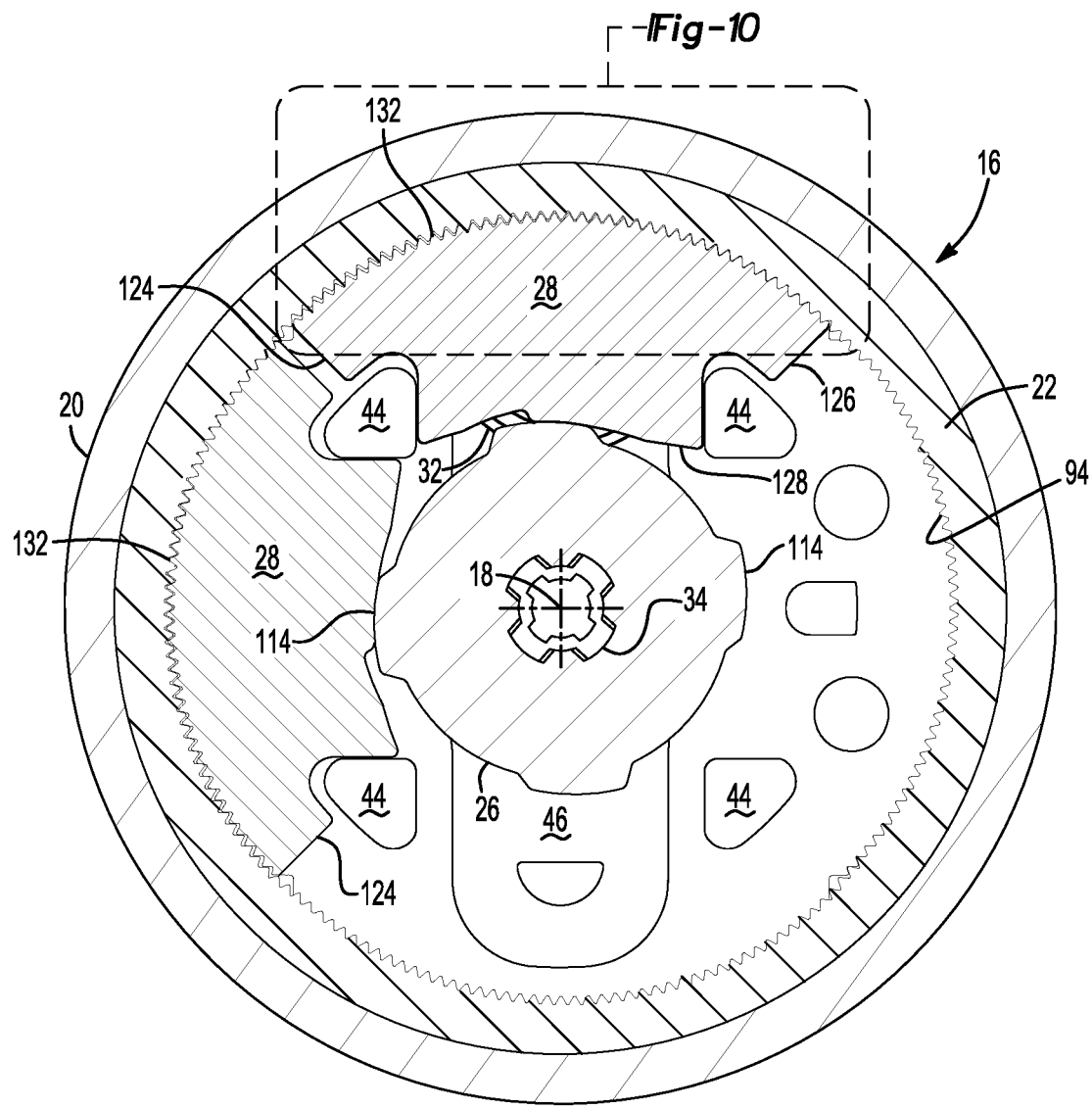
FIG. 9 is a section view of the recliner mechanism along section line 9-9 with two pawls omitted for clarity.

Referring to FIGS. 3, 4, and 7-9, one or more pawls 28 may be arranged around the cam 26. A pawl 28 may be configured to selectively engage the first set of teeth 48 and the second set of teeth 94 as will be discussed in more detail below. The recliner mechanism 16 may accommodate four pawls 28 in the configuration shown; however, it is contemplated that a greater or lesser number of pawls 28 may be provided. It is noted that FIGS. 3 and 4 show four pawls but that some pawls are omitted in FIGS. 8 and 9 to more clearly show other features, such as alignment of the teeth 48 of the first plate 20 and teeth 94 of the second plate 22. As is best shown in FIG. 8, a pawl 28 may be axially positioned between the first plate 20 and the second plate 22. Moreover, multiple pawls 28 may be coplanar with each other or may be aligned with and positioned in a common plane with the cam 26. As is best shown in FIG. 9, a pawl 28 may be located between a pair of guide blocks 44. In at least one configuration, a pawl 28 may include a first side 120, a second side 122, a first lateral side 124, a second lateral side 126, a cam following side 128, a pawl pin 130, and a set of pawl teeth 132.

Figure 7:
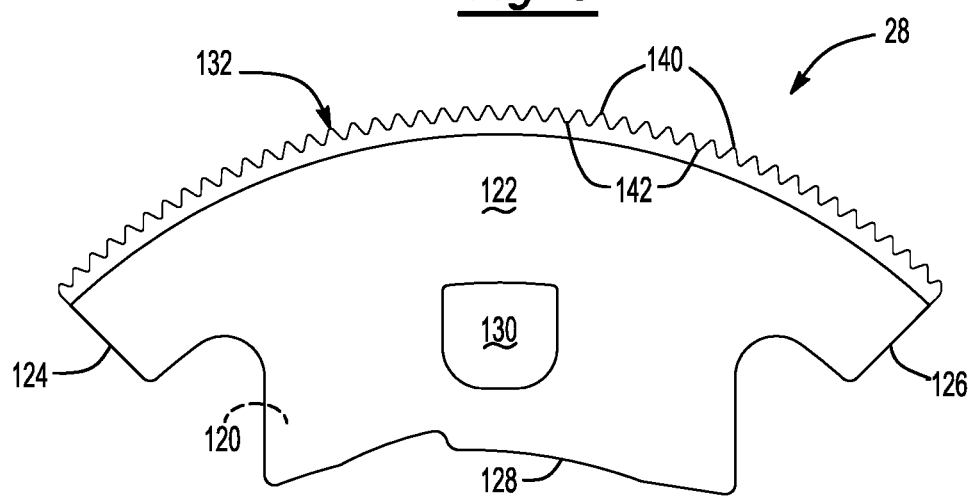
FIG. 7 is a side view of a pawl of the recliner mechanism.

Referring primarily to FIGS. 4 and 7, the first side 120 may face toward the first plate 20. The first side 120 may be contact or be supported on the first plate 20.

Referring primarily to FIGS. 3 and 7, the second side 122 may be disposed opposite the first side 120. As such the second side 122 may face toward the second plate 22. The second side 122 may engage the second plate 22, the cam disc 30, or both.

Referring primarily to FIG. 7, the first lateral side 124 may extend from the first side 120 to the second side 122. The first lateral side 124 may be disposed adjacent to the set of pawl teeth 132. In at least one configuration, the first lateral side 124 may be spaced apart from the cam following side 128 and optionally may be arranged along a radius or radial line that extends from the axis 18.

The second lateral side 126 may also extend from the first side 120 to the second side 122. The second lateral side 126 may be disposed opposite the first lateral side 124. The second lateral side 126 may be disposed adjacent to the set of pawl teeth 132. In at least one configuration the second lateral side 126 may be spaced apart from the cam following side 128 and optionally may be arranged along a radius or radial line that extends from the axis 18. In such a configuration, the first lateral side 124 may not be disposed parallel to the second lateral side 126. As is best shown in FIG. 9, the first lateral side 124 and the second lateral side 126 may not be received between the guide blocks 44 and may be spaced apart from the guide blocks 44. The second lateral side 126 may be longer than the first lateral side 124 as is best shown in FIG. 12.

Referring to FIGS. 7 and 9, the cam following side 128 may face toward the axis 18 and may engage the cam 26. For example, the cam following side 128 may be supported on a cam lobe 114 of the cam 26 when the cam 26 is rotated to extend the pawl 28 away from the axis 18. The cam following side 128 may extend from the first side 120 to the second side 122.

Referring to FIGS. 3 and 7, the pawl pin 130 may extend from the second side 122 of the pawl 28 and toward the cam disc 30. In at least one configuration, the pawl pin 130 may be disposed at or near the center of the pawl 28. In FIG. 7, the pawl pin 130 is centered between the lateral sides of the pawl 28.

The set of pawl teeth 132 may be disposed opposite the cam following side 128. The set of pawl teeth 132 may extend from the first side 120 to the second side 122. In addition, the set of pawl teeth 132 may be arranged between the first lateral side 124 and the second lateral side 126. The set of pawl teeth 132 may have the same profile as the first and second sets of teeth 48, 94 or a profile that is compatible with the first and second sets of teeth 48, 94. The pawl teeth 132 may be contiguous with each other or may be discontinuous if such an arrangement is compatible with the first and second sets of teeth 48, 94.

Some of the pawl teeth 132 or all of the pawl teeth 132 may be arranged at different radial distances from the axis 18. In a basic configuration, the pawl tooth 132 that is disposed closest to the first lateral side 124 may be disposed closer to the axis 18 than a pawl tooth 132 that is disposed closest to the second lateral side 126. As such, the tip 140 (or point of a pawl tooth 132 disposed further from the axis 18) of the pawl tooth 132 that is disposed closest to the first lateral side 124 may be disposed closer to the axis 18 or at a shorter radial distance from the axis 18 than the tip 140 of the pawl tooth 132 that is disposed closest to the second lateral side 126. As another example, a root 142 may be disposed between two adjacent pawl teeth 132 or disposed between adjacent members of the set of pawl teeth 132 and may be located at a point or distance that is disposed closest to the axis 18 with respect to its associated pawl teeth 132, and the roots 142 may be disposed progressively further from the axis 18 in a direction that extends from the first lateral side 124 toward the second lateral side 126.

As a more nuanced example described with more than two pawl teeth 132, the pawl teeth 132 or members of the set of pawl teeth 132 may be positioned progressively further from the axis 18 in a direction that extends from the first lateral side 124 to the second lateral side 126. As such a pawl tooth 132 that is disposed closest to the first lateral side 124 may be disposed closer to the axis 18 than an adjacent pawl tooth 132 that is disposed closer to the second lateral side 126. The next pawl tooth 132 in sequence that is disposed closer to the second lateral side 126 may be disposed further from the axis 18 than the preceding pawl tooth 132 and so on. Such positioning is best understood with reference to the schematic representation shown in FIG. 12.

It is noted that in FIG. 10, the pawl tooth 132 located closest to the first lateral side 124 is depicted as being spaced apart from the second set of teeth 94 while the pawl tooth 132 located closest to the second lateral side 126 is shown in contact with the second set of teeth 94; however, it is contemplated that other arrangements may be provided. For instance, the pawl tooth 132 located closest to the second lateral side 126 may not engage or contact the second set of teeth 94, but instead another tooth, such as the second pawl tooth 132 from the second lateral side 126, third pawl tooth 132 from the second lateral side 126, etc., may be the closest tooth to the second lateral side 126 that engages or contacts the second set of teeth 94. Likewise, in FIG. 11 the pawl tooth 132 located closest to the first lateral side 124 is depicted as being in contact with the first set of teeth 48 while the pawl tooth 132 located closest to the second lateral side 126 is depicted as being spaced apart from the first set of teeth 48; however, it is contemplated that other arrangements may be provided. For instance, the pawl tooth 132 located closest to the first lateral side 124 may not engage or contact the first set of teeth 48, but instead another tooth, such as the second pawl tooth 132 from the first lateral side 124, third pawl tooth 132 from the first lateral side 124, etc., may be the closest tooth to the first lateral side 124 that engages or contact the first set of teeth 48.

In FIG. 12, set of pawl teeth 132 is represented without showing the profile of the pawl teeth for clarity. The pawl 28 and the set of pawl teeth 132 are represented with a long dash-short dash line. At point A, a pawl tooth 132 may be positioned at radial distance $R_A$ from the axis 18 and may engage or mesh with the first set of teeth 48, but not the second set of teeth 94 (which has teeth 94 positioned at a greater radial distance $R_C$). This arrangement is also depicted in FIG. 11 in which one or more pawl teeth 132 at the left or closest to the first lateral side 124 engage the first set of teeth 48 and FIG. 10 in which one or more pawl teeth 132 at the left or closest to the first lateral side 124 are spaced apart from the second set of teeth 94. At point C, a pawl tooth 132 may be positioned at radial distance $R_C$ from the axis 18 and may engage or mesh with the second set of teeth 94 but not the first set of teeth 48, which is positioned at a greater radial distance from the axis 18. This is also depicted in FIG. 11 in which one or more pawl teeth 132 at the right or closest to the second lateral side 126 may be spaced apart from the first set of teeth 48 and FIG. 10 in which one or more pawl teeth 132 at the right or closest to the second lateral side 126 engage the second set of teeth 94 and FIG. 11 in which one or more pawl teeth 132 at the right or closest to the second lateral side 126 do not engage the first set of teeth 48. One or more intermediate pawl teeth 132 or pawl teeth 132 that may be located between the pawl teeth 132 that are located closest to points A and C may either (a) be spaced apart from the first set of teeth 48 and the second set of teeth 94 or (b) may engage or mesh with the first set of teeth 48 and the second set of teeth 94, meaning that an intermediate pawl tooth 132 may engage or mesh with at least one member of the first and second sets of teeth 48, 94 and not every member of the first and second sets of teeth 48, 94.

It is also contemplated that some of the pawl teeth 132 may be arranged at the same radial distance from the axis 18, or that some pawl teeth 132 may be arranged in steps such that two or more pawl teeth 132 may be arranged at the same radial distance from the axis 18 while at least one preceding pawl tooth 132 may be disposed closer to the axis 18. For example, one or more pawl teeth 132 may be disposed at the same radial distance from the axis 18, but may be disposed further from the axis 18 than one or more preceding pawl teeth 132 that may be disposed closer to point A or may be disposed further from the axis 18 than one or more succeeding teeth disposed closer to point C.

Referring to FIGS. 7 and 9, the side of the pawl 28 having the pawl teeth 132 may be longer than the cam following side 128, thereby allowing a greater number of pawl teeth 132 to be provided and allowing the pawl teeth 132 to be arranged at different radial distances from the axis 18 over a longer distance or longer arcuate length. As a result, the first lateral side 124 and the second lateral side 126 may not be received between the guide blocks 44 and may be spaced apart from the guide blocks 44. Moreover, such a configuration may allow the regions of the pawl 28 that extend past the guide blocks 44 to act as a hook or a hard stop that may engage a corresponding guide block 44 to limit the distance over which a pawl 28 can be retracted toward the axis 18. Also, providing pawl teeth 132 that extend laterally outward over the guide blocks 44 or past the guide blocks 44 may result in a wider pawl and allow more pawl teeth 132 to be provided as compared to a narrower pawl. Such "wide pawl" configurations may help provide better torque transmission or an improved ability to withstand higher torque loads as compared to a narrower pawl that does not extend laterally outward over one or more guide blocks 44.

Referring to FIGS. 3, 4, and 8, the cam disc 30 may be configured to actuate the pawls 28 when the cam disc 30 is rotated about the axis 18 as will be discussed in more detail below. As is best shown in FIG. 8, the cam disc 30 may be received inside the second plate 22 and may be axially positioned between the first plate 20 and the second plate 22. For example, the cam disc 30 may be axially positioned between the pawls 28 and the second plate 22. As is best shown in FIGS. 3 and 4, the cam disc 30 may be configured as a substantially flat disc that may be disposed substantially perpendicular to the axis 18. The cam disc 30 may be substantially circular and may extend around the axis 18. In at least one configuration, the cam disc 30 may include a center hole 150 and one or more pawl actuation openings 152.

The center hole 150 may extend around the axis 18. The center hole 150 may be configured to mate or interlock with the cam lobes 114 of the cam 26 such that the cam disc 30 rotates with the cam 26. The center hole 150 may or may not be contiguous with a pawl actuation opening 152.

A pawl actuation opening 152 may be configured to guide movement of a corresponding pawl 28 when the cam disc 30 is rotated about the axis 18 by the cam 26. The pawl pin 130 of a pawl 28 may be received in or may extend through a corresponding pawl actuation opening 152. The pawl actuation opening 152 may be angled or tapered such that the pawl actuation opening 152 guides the pawl pin 130, and hence the pawl 28, toward the axis 18 when the cam disc 30 rotates about the axis 18 in a first direction. Similarly, the pawl actuation opening 152 may guide or permit the pawl pin 130, and hence the pawl 28, to move away from the axis 18 when the cam disc 30 is rotated about the axis 18 in a second direction that is disposed opposite the first direction. For instance, the pawl actuation opening 152 may be defined by one or more surfaces of the cam disc 30. An outer surface 154 of the pawl actuation opening 152 that may face toward the axis 18 may be angled or contoured such that the outer surface 154 may be disposed closer to the axis 18 at a first end than at a second end that may be disposed opposite the first end. The pawl pin 130 may slide along the outer surface 154 when the cam disc 30 is rotated about the axis 18. As such, the outer surface 154 may exert force on the pawl pin 130 and guide movement of the pawl 28. A pawl 28 may be retracted toward the axis 18 when the cam disc 30 rotates about the axis 18 in a first direction, such as a counterclockwise direction from the perspective shown in FIG. 3, and may be permitted to move away from the axis 18 when the cam disc 30 is rotated about the axis 18 in a second direction, such as a clockwise direction from the perspective shown in FIG. 3.

Referring to FIGS. 3 and 4, one or more biasing members 32 may exert a biasing force on the cam 26 to urge the cam 26 to rotate in a manner that actuates the pawls 28 away from the axis 18. In the configuration shown, two biasing members 32 are shown; however, it is contemplated that a greater or lesser number of biasing members 32 may be provided. A biasing member 32 may be axially positioned between the first plate 20 and a pawl 28. For instance, a biasing member 32 may be received in a slot 46 in the first plate 20 and may engage the first plate 20 and the cam 26. As an example, the biasing member 32 may engage a mounting feature 50 of the first plate 20 and a cam pin 112 of the cam 26. The biasing member 32 may be of any suitable type and may have any suitable configuration. For example, the biasing member 32 may be configured as a spring.

Referring to FIGS. 3, 4, and 8, the hub 34 may be rotatable about the axis 18 and may be configured to control actuation of the recliner mechanism 16. As is best shown in FIG. 8, the hub 34 may extend through the center holes of the first plate 20, the second plate 22, the cam 26, and the cam disc 30. The portion of the hub 34 that is received in the center hole 110 of the cam 26 may mate with the cam 26 such that the hub 34 and the cam 26 rotate together about the axis 18. As such, the hub 34, cam 26, and cam disc 30 may rotate together. The hub 34 may be provided with a clip or other fastener that may inhibit axial movement or removal once the recliner mechanism 16 is assembled.

Referring to FIGS. 3 and 4, the hub 34 may be coupled to an actuator that may rotate the hub 34 in at least one direction about the axis 18. The actuator may be of any suitable type, such as a mechanical, electromechanical, or electrical actuator. Some examples of actuators include, but are not limited to a handle, electric motor, cable, or combinations thereof. A hole 160 in the hub 34 may facilitate coupling of the hub 34 to the actuator.

Operation of the recliner mechanism will now be described in more detail.

In FIG. 9, the recliner mechanism 16 is shown in a locked position. In the locked position a pawl 28 may be extended such that the pawl 28 engages the first set of teeth 48 and the second set of teeth 94, thereby inhibiting rotation of the second plate 22 about the axis 18 and with respect to the first plate 20. More specifically, at least one pawl tooth 132 may engage and mesh with the first set of teeth 48 but not the second set of teeth 94 while at least one other pawl tooth 132 may engage and mesh with the second set of teeth 94 but not the first set of teeth 48. The first set of teeth 48 may be axially aligned with the second set of teeth 94 once the pawl 28 is extended.

Rotation of the hub 34 in a first direction about the axis 18 (or counterclockwise direction from the perspective shown) may rotate the cam 26 and the cam disc 30. Sufficient rotation of the hub 34 may overcome the biasing force of the biasing member 32 and cause a pawl 28 to retract or move toward the axis 18 due to the actuation force exerted by the cam disc 30 on the pawl pin 130. As such, the pawl 28 may disengage the first set of teeth 48 on the first plate 20 and the second set of teeth 94 on the second plate 22, thereby allowing the second plate 22 to rotate about the axis 18 with respect to the first plate 20. Accordingly, the seat back 14 may be folded or reclined to a different angular position as desired.

Once the seat back 14 is in a desired angular position, the pawl 28 may be extended or may return to the extended position under the biasing force of the biasing member 32 when the hub 34 is released or is permitted to return to the extended position.

The recliner mechanism described above may allow a recliner mechanism to be provided with a compact design and greater mechanical strength that may accommodate greater torque loads (e.g., over 5000 Nm) than other recliner mechanism designs. As a result, a single recliner mechanism rather than two recliner mechanisms (with recliner mechanisms mounted at opposite lateral sides of the seat back) may be provided with some seat configurations to meet load requirements, thereby reducing cost and complexity. Two recliner mechanisms (with recliner mechanisms mounted at opposite lateral sides of the seat back) may be provided with other seat configurations that may be subject to high torsional load forces, such as may be associated with a seat having an integrated seatbelt (e.g., a seatbelt that is mounted to or within the seat assembly) or for seat assemblies that may be used in vehicles having nontraditional seating positions in which a seat may not face toward the front of the vehicle, such as may be provided in an autonomous vehicle, which may need to withstand greater loads during a vehicle impact event.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
   a first plate having a first set of teeth;
   a second plate that is rotatable about an axis with respect to the first plate, the second plate having a second set of teeth; and
   a pawl having a first lateral side, a second lateral side, and set of pawl teeth arranged between the first lateral side and the second lateral side, the set of pawl teeth including a first pawl tooth and a second pawl tooth, wherein the first pawl tooth is disposed closer to the first lateral side than the second pawl tooth, the first pawl tooth is disposed closer to the axis than the second pawl tooth, the first pawl tooth engages the first set of teeth but not the second set of teeth, and the second pawl tooth engages the second set of teeth but not the first set of teeth to inhibit rotation of the second plate with respect to the first plate.

2. The recliner mechanism of claim 1 wherein members of the set of pawl teeth are arranged contiguously from the first lateral side to the second lateral side.

3. The recliner mechanism of claim 1 wherein the set of pawl teeth faces away from the axis and is received inside the first plate and the second plate.

4. The recliner mechanism of claim 1 wherein members of the set of pawl teeth are positioned progressively further from the axis in a direction that extends from the first lateral side to the second lateral side.

5. The recliner mechanism of claim 1 wherein the first pawl tooth is disposed closest to the first lateral side and the second pawl tooth is disposed closest to the second lateral side.

6. The recliner mechanism of claim 1 wherein the first pawl tooth has a first tip that is located furthest from the axis, the second pawl tooth has a second tip that is located furthest from the axis, and the first tip is disposed closer to the axis than the second tip.

7. A recliner mechanism comprising:
   a first plate having a first set of teeth;
   a second plate that is rotatable about an axis with respect to the first plate, the second plate having a second set of teeth; and
   a pawl that has a first lateral side, a second lateral side, and set of pawl teeth that extends toward the first set of teeth and the second set of teeth and are arranged between the first lateral side and the second lateral side such that members of the set of pawl teeth are positioned progressively further from the axis in a direction that extends from the first lateral side to the second lateral side.

8. The recliner mechanism of claim 7 wherein the first lateral side and the second lateral side are arranged along radii that extend from the axis.

9. The recliner mechanism of claim 7 wherein each member of the set of pawl teeth has a tip that is located furthest from the axis, wherein the tip of each pawl tooth is disposed at a different radial distance from the axis.

10. The recliner mechanism of claim 7 wherein each member of the set of pawl teeth has a tip that is located furthest from the axis, wherein the tips of the pawl teeth are positioned progressively closer to the axis in the direction that extends from the second lateral side to the first lateral side.

11. The recliner mechanism of claim 7 wherein a root is disposed between adjacent members of the set of pawl teeth, wherein the roots are located progressively further from the axis in the direction that extends from the first lateral side toward the second lateral side.

12. The recliner mechanism of claim 7 wherein the set of pawl teeth includes a first pawl tooth that engages the first set of teeth but not the second set of teeth, a second pawl tooth that engages the second set of teeth but not the first set of teeth, and an intermediate pawl tooth that is disposed between the first pawl tooth and the second pawl tooth and engages the first set of teeth and the second set of teeth when the pawl is in an extended position.

13. The recliner mechanism of claim 7 wherein the pawl is disposed between a pair of guide blocks that extend from the first plate toward the second plate and the first lateral side and the second lateral side are not received between and do not engage the guide blocks.

14. A recliner mechanism comprising:
   a first plate having a first set of teeth that is arranged around an axis, wherein the first set of teeth includes a first tooth segment having teeth that are arranged at different radial distances from the axis;
   a second plate that is rotatable about the axis with respect to the first plate, the second plate having a second set of teeth; and
   a pawl that has a set of pawl teeth that engages the first set of teeth and the second set of teeth to inhibit rotation of the second plate with respect to the first plate.

15. The recliner mechanism of claim 14 wherein members of the second set of teeth are arranged at a common radial distance from the axis.

16. The recliner mechanism of claim 14 wherein the first tooth segment is located between a first step and a second step of the first plate, wherein the teeth of the first tooth segment are positioned progressively further from the axis in a direction that extends from the first step to the second step.

17. The recliner mechanism of claim 16 wherein the first tooth segment has a first tooth that is located closest to the first step and is disposed closer to the axis than each member of the second set of teeth.

18. The recliner mechanism of claim 17 wherein the first tooth segment has a second tooth that is located closest to the second step and is disposed further from the axis than each member of the second set of teeth.

19. The recliner mechanism of claim 16 wherein the pawl engages the first tooth segment between the first step and the second step.

20. The recliner mechanism of claim 16 wherein members of the set of pawl teeth are positioned progressively further from the axis in the direction that extends from the first step toward the second step.

\* \* \* \* \*